Aug. 23, 1932.  L. HAMMOND  1,873,397
METHOD OF MAKING STATOR AND ROTOR PLATES
Filed July 30, 1930  2 Sheets-Sheet 1
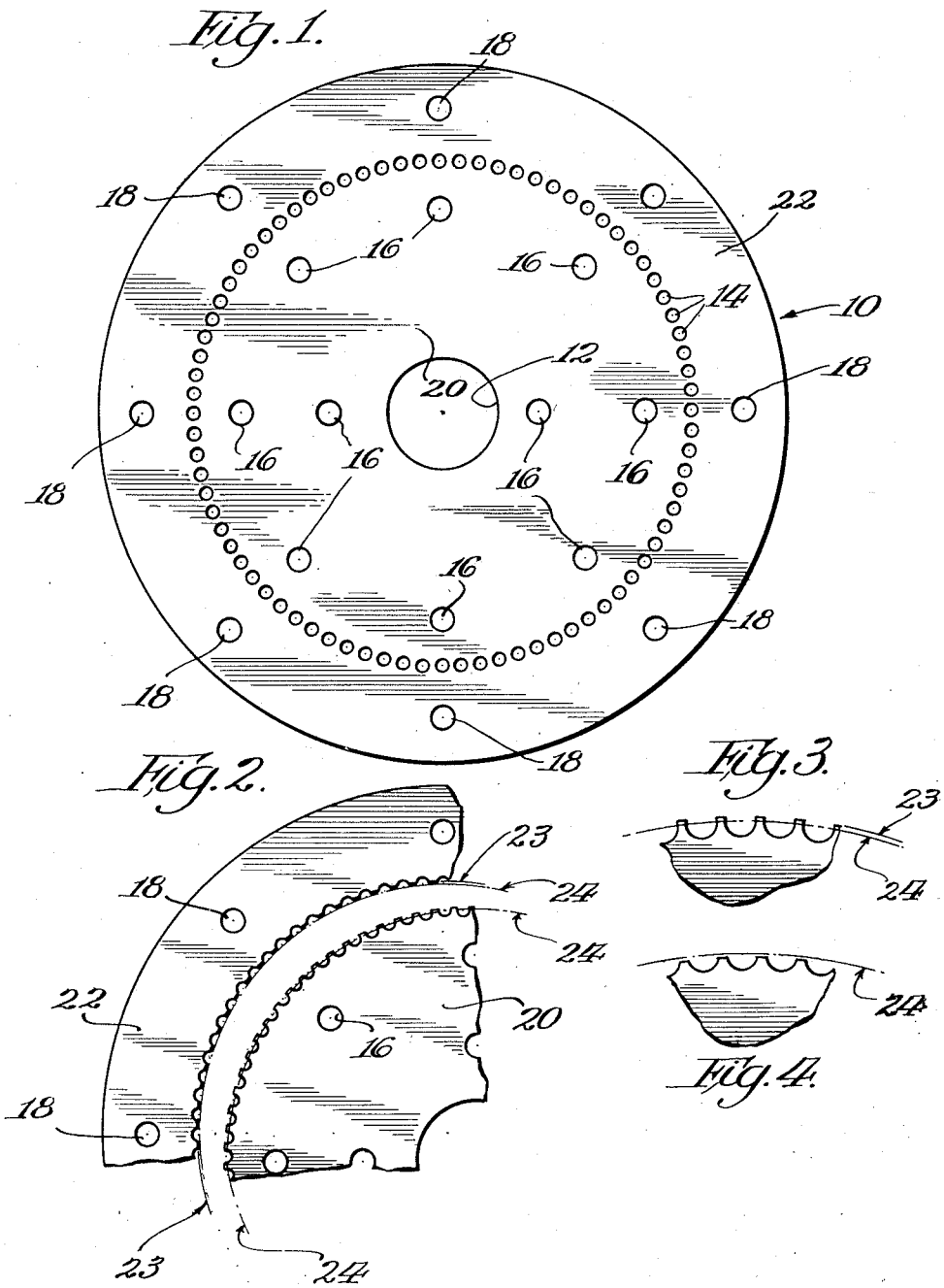

Aug. 23, 1932.   L. HAMMOND   1,873,397
METHOD OF MAKING STATOR AND ROTOR PLATES
Filed July 30, 1930   2 Sheets-Sheet 2

Inventor
Laurens Hammond
by Williams, Bradbury, McCaleb & Hinkle
Attys.

Patented Aug. 23, 1932

1,873,397

UNITED STATES PATENT OFFICE

LAURENS HAMMOND, OF EVANSTON, ILLINOIS, ASSIGNOR TO THE HAMMOND CLOCK COMPANY, OF CHICAGO, ILLINOIS, A CORPORATION OF DELAWARE

METHOD OF MAKING STATOR AND ROTOR PLATES

Application filed July 30, 1930. Serial No. 471,657.

My invention relates to the method of making stator and rotor plates for use in the construction of synchronous motors.

As is well known, certain types of synchronous motors comprise an unwound laminated rotor which cooperates with laminated poles, the rotor and poles having complemental registering teeth. The forming of the laminations with a large number of teeth has in the past required the use of complicated and very expensive dies which, after rapidly becoming dulled, were difficult to recondition for use. Furthermore, two sets of dies were required, one for the rotor and one for the stator. By employing the method of my invention the necessity for two sets of these complicated dies is eliminated, the one set of dies used is much simpler in construction, is much more durable, and may easily be reconditioned. It is therefore the primary object of my invention to provide an improved method of forming rotor and stator laminations, particularly for use in the manufacture of synchronous motors.

Other objects will appear from the following description, reference being had to the accompanying drawings, in which:

Fig. 1 shows the sheet after the first punching operation;

Fig. 2 is a fragmentary view showing the shape of the laminations after the completion of the second operation;

Fig. 3 is a relatively enlarged fragmentary view of the central or stator portion shown in the same condition as in Fig. 2;

Fig. 4 is a view similar to Fig. 3 showing the stator lamination after completion of the third step in the method.

Figure 6:
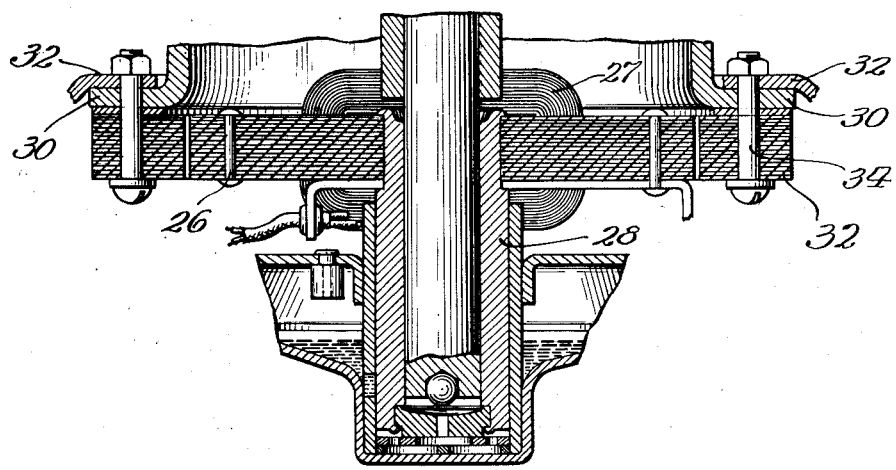
Fig. 6 is a fragmentary central vertical sectional view, showing how the rotor and stator laminations are mounted in a motor.

In certain types of synchronous motors (as more fully disclosed in my copending application Serial No. 471,655, filed July 30, 1930), the central portion is held comparatively stationary, and will hereinafter be called the stator, while the outer portion is rotatable about the stator and will hereinafter be called the rotor. Both the stator and rotor are made of a plurality of soft iron sheets or laminations which are riveted together.

The sheet 10 shown in Fig. 1 illustrates one of these laminations in the process of manufacture, the sheet 10 being used to form a lamination for both the stator and the rotor. It is formed by the customary punching operation. The dies for this punching operation are formed so as simultaneously to punch a central hole 12, a concentric row of smaller holes 14, a plurality of stator rivet holes 16, and a plurality of rotor and bolt holes 18. The concentric row of holes 14 is approximately the dividing line between the portion of the sheet 10 which will eventually be used to form the stator and that portion which will be used to form the rotor. The stator portion 20 comprises generally that disc-shaped portion lying within the row of concentric holes 14, and the rotor portion 22 the annular portion lying beyond the row of holes 14.

After the sheet 10 has been punched, as illustrated in Fig. 1, the sheet 10 is placed in another punch press and sheared along a circular line 23 which lies a short distance beyond the center line 24 of the concentric row of holes 14, thus separating the stator portion 20 from the rotor portion 22. Upon completion of this punching operation the rotor portion 22 will be ready for use. The teeth on the stator portion will, however, be too long, as clearly illustrated in Fig. 3, and therefore have their ends sheared off by a suitable punching operation so that the teeth will assume the shape shown in Fig. 4. The die used in this operation is also provided with means to punch out slots 25 which are adapted to receive the windings of coils 27 (Fig. 6) in the finished stator.

Figure 5:
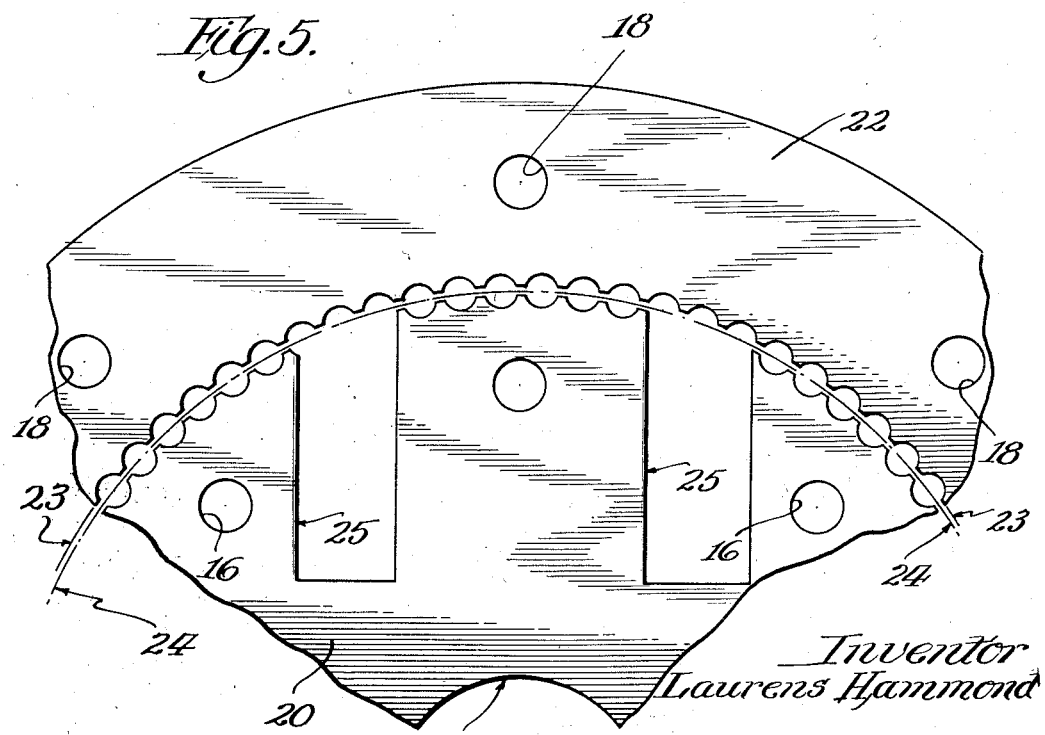
Fig. 5 is a fragmentary enlarged view of the rotor and stator laminations illustrating their relative positions when properly mounted in the motor.

For the purpose of illustration, the amount of material which is sheared from the ends of the teeth of the stator 20 is slightly exaggerated in the drawings. It will be understood that it is sufficient to remove only enough of the ends of the teeth of the stator to provide clearance between the stator and rotor. This clearance is illustrated in Fig. 5 which shows portions of the rotor and stator in the positions which these parts assume when properly assembled in the motor.

It will thus be seen that with three very simple punching operations the laminations for both stator and rotor may readily be manufactured. To those skilled in the art it will be apparent that the dies required may be of exceedingly simple construction, that they may readily be reconditioned after having become worn, and that the cost of manufacture of the parts may thus be greatly reduced.

When the stator and rotor laminations are thus completed, a suitable number of the stator laminations are assembled to form the stator, by rivets 26 (Fig. 6) which pass through the holes 16. While riveting the laminations, it is not only important that the teeth be kept in accurate alignment, as, for example, by temporarily inserting an aligning pin in one of the rivet holes 16, but it is also of importance to maintain the laminations in position by a centering pin passing through the holes 12. The finished stator is then secured to a tubular shaft 28.

The rotor laminations 22 are rigidly secured to the rotating parts 30, 32 of the motor by bolts 34. When the laminations are made as above described, the assembly operation is easily performed to produce rotors and stators in which the teeth of the laminations are accurately aligned, in which all teeth are of the same length, and in which the rotor and stator may be easily assembled in the motor with a high degree of accuracy. The form of the teeth on the rotor and stator has been found to result in highly satisfactory operation of the motor. Thus not only may the rotor and stator be more economically and accurately produced by the method of my invention, but the parts themselves are of superior form and design.

Having described my invention, what I claim and desire to secure by Letters Patent is:

1. The method of manufacturing two parts having complemental concentric rows of registering teeth which comprises forming a blank with a circular row of holes spaced to form said teeth, shearing said blank along a circular line passing through said circular row of holes so that the teeth in the desired form will be formed on one of said pieces, and shearing off the ends of the teeth on the other of said pieces to the desired height to form working clearance between the teeth on the respective pieces when assembled in concentric relation to one another.

2. The method of manufacturing stator and rotor laminations for synchronous motors which comprises punching a blank sheet with a circular row of holes, the pitch of which is the same as the pitch of the teeth desired on said stator and rotor, severing the inner portion of said blank from the outer portion thereof along a line passing through said row of concentric holes, and removing the excess material from the teeth of one of the members thus formed.

3. The method of making stator and rotor laminations for synchronous motors which comprises punching from a sheet of lamination material a blank for forming both stator and rotor and at the same time punching a center hole and a circular row of holes equally spaced from said center hole, shearing said blank to separate the stator portion of said blank from the rotor portion thereof along a line passing through said row of holes and removing excess material from the teeth thus formed on one of said members.

In witness whereof, I hereunto subscribe my name this 25th day of July, 1930.

LAURENS HAMMOND.